Nov. 8, 1966   W. N. DEAR   3,284,163
MEANS FOR CONNECTING METAL AND REFRACTORY TUBULAR MEMBERS
Filed June 25, 1963
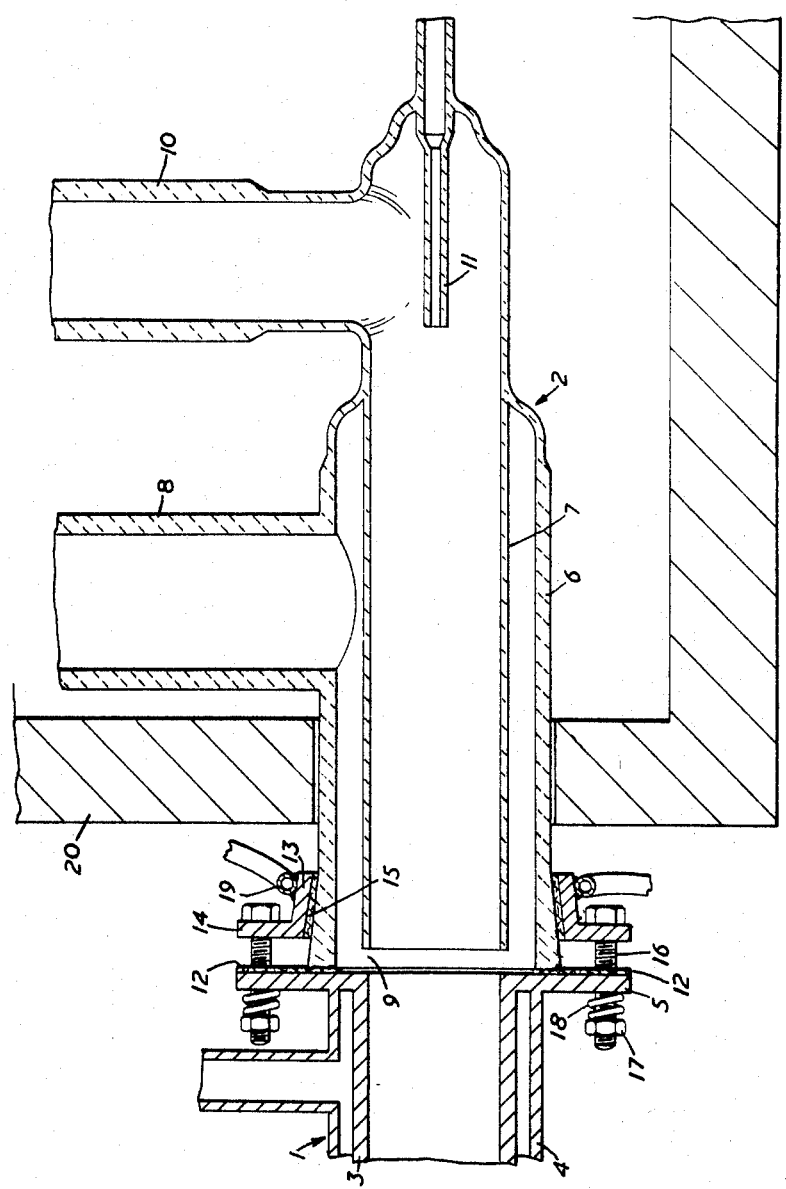
WILLIAM NOEL DEAR
INVENTOR.
BY [signature]
ATTORNEY.

United States Patent Office 3,284,163
Patented Nov. 8, 1966

3,284,163
MEANS FOR CONNECTING METAL AND REFRACTORY TUBULAR MEMBERS
William Noel Dear, Grimsby, England, assignor to Laporte Titanium Limited, London, England, a British company
Filed June 25, 1963, Ser. No. 290,479
Claims priority, application Great Britain, July 11, 1962, 26,718/62
11 Claims. (Cl. 23—252)

The present invention relates to tubular apparatus including, for example, pipes and cylindrical chemical reactors. It has particular reference to such apparatus in which one portion is made of metal and another portion is made of a non-metallic refractory material, hereinafter referred to simply as a "refractory material."

It is often necessary to construct such apparatus at least partly of a refractory material so that it will be able to withstand contact with corrosive substances at high temperatures. However, refractory materials suffer from the disadvantage that they do not possess high mechanical strength. Also, they are sometimes inconvenient to fabricate and handle. Therefore, it is desirable to use metal for the construction of any part of the apparatus that is not subject to such stringent conditions as to require the use of refractory material. Hitherto, however, the difficulties of making a satisfactory joint between a refractory material designed to withstand high temperatures and a metal for use at lower temperatures often have prevented this from being done.

This invention provides apparatus comprising a tubular part made of metal and a tubular part made of a refractory material. The tubular parts are arranged end to end, i.e., in abutting relationship, with a thermally insulating gasket interposed between their adjacent surfaces. A metal ring is arranged about and encircles the end of the refractory part which is near the end of the metal part. The outer surface of the refractory part is shaped in a suitable manner whereby to limit movement of the metal ring towards the metal part and relative to the refractory part. A layer of thermally insulating material is interposed between the ring and the refractory part. Connecting means is provided for resiliently securing the ring to the metal part whereby to effect a joint between the refractory part and the metal part. Also, there is provided means for cooling the ring.

To limit the movement of the ring towards the metal part and relative to the refractory part, the outer surface of the end portion of the refractory part adjacent to the metal part is flared or tapered outwardly and the inner surface of the ring is tapered correspondingly to assure a flush fit. Alternatively, the said outer surface may be formed with a circumferentially disposed, outwardly extending ridge or shoulder or with a plurality of circumferentially spaced, outwardly extending projections arranged to engage the ring and limit its movement toward the metal part and relative to the refractory part.

Advantageously, the metal part is formed, at the end adjacent to the refractory part, with an outwardly extending flange or flanges and the connecting means comprises a plurality of spring-loaded bolts which pass through apertures in the flange or flanges and are connected to the ring. Preferably, the ring is also formed with an outwardly extending flange or flanges formed with apertures through which the bolts pass to provide a connection between the bolts and the ring.

Preferably, the cooling means for the ring comprises a conduit (preferably a copper tube) which is in contact with the outer surface of the ring about at least the greater part, and preferably substantially the whole, of the circumference of the ring and through which a coolant fluid can be passed.

If desired, the metal part may be provided with a cooling jacket through which a coolant fluid can be passed. When the metal part is provided with an outwardly extending flange at the end adjacent to the refractory part, the inner portion of this flange may form one end wall of the cooling jacket.

The metal part of the tubular apparatus may be made of aluminum, steel, stainless steel, nickel, copper, magnesium, titanium and the like. Alloys of these metals also are suitable.

The refractory material may be alumina, silica, transparent or translucent fused quartz, glass, fused ceramics, zircon and the like. These materials may be used singly or in suitable combinations of two or more.

The gasket and thermally insulating material advantageously comprise woven silica impregnated with silica powder. Asbestos also can be used. If desired, a combination of asbestos and a thin layer of woven silica can be interposed between the ring and the refractory part. Examples of other suitable materials include glass cloth, mica flakes, alumina and the like. If desired, one thermally insulating material may be used for the construction of the gasket and a different thermally insulating material may be used for the layer of material that is interposed between the ring and the refractory part.

The metal part-refractory part joint can be made satisfactorily gas-tight for most purposes provided that the pressure difference between the interior and exterior of the apparatus is not too great. If the joint forms part of an apparatus in which a substantially superatmospheric pressure is maintained, a positive pressure may be applied in the region of the joint by, for example, providing a jacket which surrounds the exterior of the joint and into which there can be introduced a fluid under pressure. This, of course, would prevent or minimize the leakage of fluid through the joint from the interior of the apparatus.

The apparatus of this invention is particularly suitable for use as a tubular burner in the production of titanium dioxide by the vapor phase oxidation of titanium tetrachloride. Such a burner is illustrated in axial cross-section in the accompanying drawing.

The burner illustrated in the drawing comprises a metal tubular part, indicated generally by reference numeral 1, arranged end to end with a refractory tubular part, indicated generally by the reference numeral 2, constructed of silica.

The metal part 1 comprises a cylindrical portion 3 which is surrounded by a cooling jacket 4. At the end adjacent to the silica part 2, the metal part 1 is provided with an outwardly extending annular flange 5.

The silica part 2 comprises an outer wall 6 which surrounds an inner wall 7. A supply pipe 8 enables one of the reactants to be supplied to the region between the two walls 6 and 7, and the inner wall 7 terminates short of the outer wall 6 to provide an annular slot 9 between the end of the inner wall 7 and the outer face of the flange 5. The annular slot 9 serves as an inlet for the reactant supplied through the pipe 8. A supply pipe 10 enables the other reactant to be supplied to the interior of the inner wall 7. A nozzle 11, which is coaxial with the burner, is provided for the introduction of a particulate refractory matrial as described in co-pending application Serial No. 234,364 filed October 31, 1962.

The outer surface of the end portion of the outer wall 6 that is adjacent to the metal part 1 is flared outwardly and, as the inner surface of this end portion of the outer wall 6 is cylindrical, this results in an increase in the thickness of this end portion of the outer wall 6. Between the end of the outer wall 6 and the flange 5 there is inserted a thermally insulating gasket 12 made of woven silica impregnated with silica powder. Arranged around the end portion of the outer wall 6 is a ring 13, which is tapered correspondingly and at substantially the same angle as the outer surface of the outer wall 6. Ring 13 is provided, at the end towards the metal part 1, with an outwardly extending annular flange 14. Interposed between the inner surface of the ring 13 and the outer surface of the outer wall 6 is a layer 15 of woven silica impregnated with silica powder.

The flanges 5 and 14 and the gasket 12 are fitted with aligned apertures, which are arranged at equal intervals around the circumference, and through which there pass bolts 16. The bolts 16 are secured in position by nuts 17, and coil springs 18 are interposed between the nuts 17 and the inner surface of the flange 5 so that the bolts 16 are spring-loaded. Because of the flaring of the outer surface of the outer wall 6, movement of the ring 13 towards the metal part 1 and relative to the silica part 2 is limited and therefore tightening the nuts and bolts causes the metal part 1 and the silica part 2 to be drawn together so that the gasket 12 is compressed and a gas-tight joint is formed.

In order to enable the ring 13 to be cooled, there is provided a copper pipe 19, through which a coolant fluid can be passed, which passes around the ring 13 and is silver-soldered to the outer surface of the ring.

In use, the silica part 2 may be situated within a pre-heat furnace of which a part of the wall 20 is shown schematically. Thus, when the burner is brought into operation, a considerable temperature difference develops between the metal part 1 and the silica part 2. Also, the coefficient of thermal expansion of silica and metal are substantially different. The gasket 12, the layer of insulating material 15 and the cooling pipe 19, however, ensure that the metal parts of the joint remain at a temperature considerably below the temperature of the silica part 2 and the spring-loading of the bolts 16 allows any differential expansion that may occur to be taken up.

This burner may also be used for the production of an oxide of one of the elements zirconium, iron, aluminum and silicon by the vapor-phase oxidation of a chloride of the element.

While the present invention has been described with respect to what at present are considered to be preferred embodiments thereof, it will be understood, of course, that certain changes, modifications, substitutions and the like may be made therein without departing from its true scope.

What is claimed is:

1. Apparatus comprising a tubular part made entirely of metal and a tubular part made entirely of a refractory material, said parts being arranged end-to-end with a thermally insulating gasket interposed between the tubular parts to prevent any contact between their abutting surfaces, a metal ring disposed about the refractory part, the outer surface of the refractory part being shaped to limit movement of the metal ring towards the metal part and relative to the refractory part, a layer of thermally insulating material interposed between the ring and the refractory part, connecting means for resiliently securing the ring to the metal part, and means for cooling the ring.

2. Apparatus as set forth in claim 1 wherein the outer surface of the end portion of the refractory part adjacent to the metal part is flared outwardly and the inner surface of the ring is tapered correspondingly whereby to limit the movement of the ring towards the metal part and relative to the refractory part.

3. Apparatus as set forth in claim 1 wherein the outer surface of the end portion of the refractory part adjacent to the metal part is formed with a circumferentially disposed, outwardly extending shoulder arranged to engage the ring to limit its movement toward the metal part and relative to the refractory part.

4. Apparatus as set forth in claim 1 wherein the outer surface of the end portion of the refractory part adjacent to the metal part is formed with a plurality of circumferentially spaced, outwardly extending projections arranged to engage the ring to limit its movement toward the metal part and relative to the refractory part.

5. Apparatus as set forth in claim 1 wherein the end of the metal part adjacent to the refractory part is provided with an outwardly extending flange and the connecting means comprises a plurality of spring-loaded bolts which pass through apertures in the flange and are connected to the ring.

6. Apparatus as set forth in claim 1 wherein the cooling means for the ring comprises a conduit in contact with the outer surface of the ring about at least the greater part of circumference of the ring and through which a coolant fluid can be passed.

7. Apparatus as set forth in claim 1 wherein the metal part is provided with a cooling jacket through which a coolant fluid can be passed.

8. Apparatus as set forth in claim 1 wherein the refractory material is alumina.

9. Apparatus as set forth in claim 1 wherein the refractory material is silica.

10. Apparatus as set forth in claim 1 wherein the refractory material is fused quartz.

11. Apparatus as set forth in claim 1 wherein the thermally insulating material is woven silica impregnated with silica powder.

References Cited by the Examiner

UNITED STATES PATENTS

| | | | |
|---|---|---|---|
| 2,127,694 | 8/1938 | Miller | 285—50 |
| 2,472,497 | 6/1949 | Stookey | 126—91 |
| 2,667,684 | 2/1954 | Boyer et al. | 277—230 X |
| 2,891,807 | 6/1959 | Auwarter | 285—41 |
| 3,004,780 | 10/1961 | Main | 285—368 X |
| 3,065,000 | 11/1962 | Stanton | 285—368 X |
| 3,131,245 | 4/1964 | Lorenz | 285—368 X |

MORRIS O. WOLK, *Primary Examiner.*

JAMES H. TAYMAN, Jr., J. J. MULLEN,
*Assistant Examiners.*